Patented Apr. 11, 1950

2,504,074

UNITED STATES PATENT OFFICE 2,504,074

INTERPOLYMERS OF ACRYLAMIDE AND METHACRYLAMIDE

Giffin D. Jones, Easton, Pa., assignor to General Aniline & Film Corporation, New York, N. Y., a corporation of Delaware No Drawing. Application October 16, 1945, Serial No. 622,705

6 Claims. (Cl. 260—8)

The present invention relates to new interpolymers and more particularly to interpolymers of acrylamide and methacrylamide which are water-soluble and campatible with gelatin.

It is among the objects of my invention to produce interpolymers which may serve as a substitute for gelatin and be employed in combination with gelatin to provide compositions highly useful in the photographic art.

According to my invention, I provide water-soluble and gelatin compatible interpolymers of methacrylamide and acrylamide, in which the ratio of methacrylamide to acrylamide does not exceed 9:1, and preferably interpolymers in which the ratio of methacrylamide and acrylamide ranges from about 8:5 to about 1:9. My invention also comprises novel compositions of my new interpolymers with gelatin.

By "gelatin-compatible interpolymers," I mean interpolymers which, together with gelatin, yield aqueous solutions from which a clear film is obtained by casting.

The new interpolymers are, in general, prepared by subjecting the mixtures of the monomers in the desired proportions while dissolved in an aliphatic alcohol such as, for example, methyl alcohol, ethyl alcohol, and tertiary-butyl alcohol to polymerization by exposure to ultraviolet light. Instead of ultraviolet light there may be employed another suitable catalyst to facilitate polymerization. Any oxygen-containing catalysts such as benzoyl peroxide, potassium persulfate, peracetic acid, etc., may be employed for this purpose. However, when the interpolymer is to be used for photographic purposes, the presence of an oxygen-containing catalyst therein may result in fogging. Accordingly, I prefer to carry out the polymerization in the absence of any oxygen-containing catalysts.

Polymerization may be effected at any desirable temperature. While room temperature is preferred in carrying out the polymerization, other suitable temperatures may be employed. In general, carrying out the polymerization at lower temperature results in a higher molecular weight interpolymer, whereas increasing the temperature decreases the molecular weight of the interpolymer.

While any aliphatic alcohol may be utilized in which the monomers are soluble, interpolymers of methacrylamide and acrylamide which are water-soluble and gelatin compatible are most effectively obtained when utilizing methyl alcohol as the solvent. Tertiary-butyl alcohol is equally effective. The aliphatic alcohol solvents may be utilized in any desirable amount. In general, decreasing the concentration of the monomers in the solvent results in a decrease in the molecular weight of the interpolymer while increasing the concentration results in an interpolymer of increased molecular weight. Thus, by varying temperature and concentration, there may be obtained interpolymers of any desired molecular weight and viscosity. However, when following my procedure there is obtained an interpolymer which is water-soluble and compatible with gelatin.

The following examples will serve to illustrate my invention, the parts being by weight.

Example 1

The following mixtures of acrylamide and methacrylamide were each dissolved in 5.6 parts of methanol and polymerized in an evacuated glass reactor by exposure to ultraviolet light at 40° C. for 12 hours. In each case a white interpolymer precipitated from the solution and could be recovered by filtration.

|   | Acrylamide | Methacrylamide |
|---|---|---|
|   | Parts | Parts |
| A | 0.33 | 3.00 |
| B | 0.67 | 2.67 |
| C | 1.00 | 2.33 |
| D | 1.25 | 2.00 |
| E | 1.00 | 1.00 |
| F | 2.00 | 1.33 |
| G | 2.33 | 1.00 |
| H | 2.67 | 0.67 |
| I | 3.00 | 0.33 |

One part of each of the interpolymers obtained as above and 9 parts of gelatin were mixed with 90 parts of water. In each case, a clear, viscous solution was obtained which, when cast, formed a clear film, indicating compatibility of the interpolymer with gelatin. However, interpolymers exhibiting highest compatibility with gelatin were interpolymers D to I, where the ratio of methacrylamide to acrylamide in the polymer ranged from 8:5 to 1:9. Accordingly, these interpolymers are particularly valuable for combining with gelatin to produce gelatin compositions of great value for photographic purposes.

I have found that instead of utilizing the aliphatic alcohols per se as the solvent medium, a medium comprising water and a preponderant amount of the alcohol is also highly satisfactory for producing water-soluble and gelatin compatible interpolymers of acrylamide and methacrylamide. In this case the ratio of alcohol to water should be approximately 4:1 or greater, when it is desired to obtain a water-soluble and gelatin compatible interpolymer. The following example is illustrative of the use of a solvent medium comprising an aliphatic alcohol and water.

Example 2

In a methanol solution comprising 8 parts of methanol and 2½ parts of water there was added 1.25 parts of acrylamide and 1.25 parts methacrylamide. The resulting solution was placed in an evacuated glass reactor and subjected to ultraviolet light at 40° C. for about 12 hours. A white interpolymer precipitated which was separated by filtration. The interpolymer was found to be water-soluble.

When 1 part of the interpolymer and 9 parts of gelatin were added to 90 parts of water, a clear viscous solution was obtained which, when cast, formed a perfectly clear film.

In the following claims it is understood that all parts are by weight and that the expression "up to 2.5 parts" signifies 0 to 2.5 parts.

I claim:

1. A method of forming a water-soluble, gelatin-compatible interpolymer of methacrylamide and acrylamide, which comprises catalytically copolymerizing methacrylamide and acrylamide in a ratio from 1:9 to 9:1 at a temperature from room temperature to 40° C., in an inert solvent composed essentially of a saturated monohydric aliphatic alcohol and up to 2.5 parts of water to each 8 parts of said alcohol until a water-soluble interpolymer is obtained.

2. A method of forming a water-soluble, gelatin-compatible interpolymer of methacrylamide and acrylamide, which comprises catalytically copolymerizing methacrylamide and acrylamide in a ratio from 8:5 to 1:9 at a temperature from room temperature to 40° C., in an inert solvent composed essentially of a saturated monohydric aliphatic alcohol and up to 2.5 parts of water to each 8 parts of said alcohol until a water-soluble interpolymer is obtained.

3. A method of forming a water-soluble, gelatin-compatible interpolymer of methacrylamide and acrylamide, which comprises catalytically copolymerizing methacrylamide and acrylamide in a ratio from 8:5 to 1:9 at a temperature from room temperature to 40° C., in methyl alcohol until a water-soluble interpolymer is obtained.

4. A method of forming a water-soluble, gelatin-compatible interpolymer of methacrylamide and acrylamide, which comprises catalytically copolymerizing methacrylamide and acrylamide in a ratio from 8:5 to 1:9 at a temperature from room temperature to 40° C., in a solvent composed of methyl alcohol and water in a ratio of at least 8:2.5 until a water-soluble interpolymer is obtained.

5. A water-soluble, gelatin-compatible interpolymer of methacrylamide and acrylamide in which the ratio of methacrylamide to acrylamide is from 1:9 to 9:1, prepared by catalytic copolymerization of the monomer components at a temperature from room temperature to 40° C., in an inert solvent composed essentially of a saturated monohydric aliphatic alcohol and up to 2.5 parts of water to each 8 parts of said alcohol until a water-soluble interpolymer is obtained.

6. A composition of matter comprising gelatin and water-soluble, gelatin-compatible interpolymer of methacrylamide and acrylamide in which the ratio of methacrylamide to acrylamide is from 1:9 to 9:1, prepared by catalytic copolymerization of the monomer components at a temperature from room temperature to 40° C., in an inert solvent composed essentially of a saturated monohydric aliphatic alcohol and up to 2.5 parts of water to each 8 parts of said alcohol, until a water-soluble interpolymer is obtained, the ratio of said interpolymer to gelatin being 1:9.

GIFFIN D. JONES.

REFERENCES CITED

The following references are of record in the file of this patent:

UNITED STATES PATENTS

| Number | Name | Date |
|---|---|---|
| 1,981,102 | Hagedorn et al. | Nov. 20, 1934 |
| 2,006,002 | Schneider | June 25, 1935 |
| 2,135,443 | Strain | Nov. 1, 1938 |
| 2,289,540 | Dittmar et al. | July 14, 1942 |

FOREIGN PATENTS

| Number | Country | Date |
|---|---|---|
| 467,402 | Great Britain | June 11, 1937 |